R. H. BOWEN & A. WALKER.
PULLEY.
APPLICATION FILED MAR. 24, 1911.
1,016,666.
Patented Feb. 6, 1912.
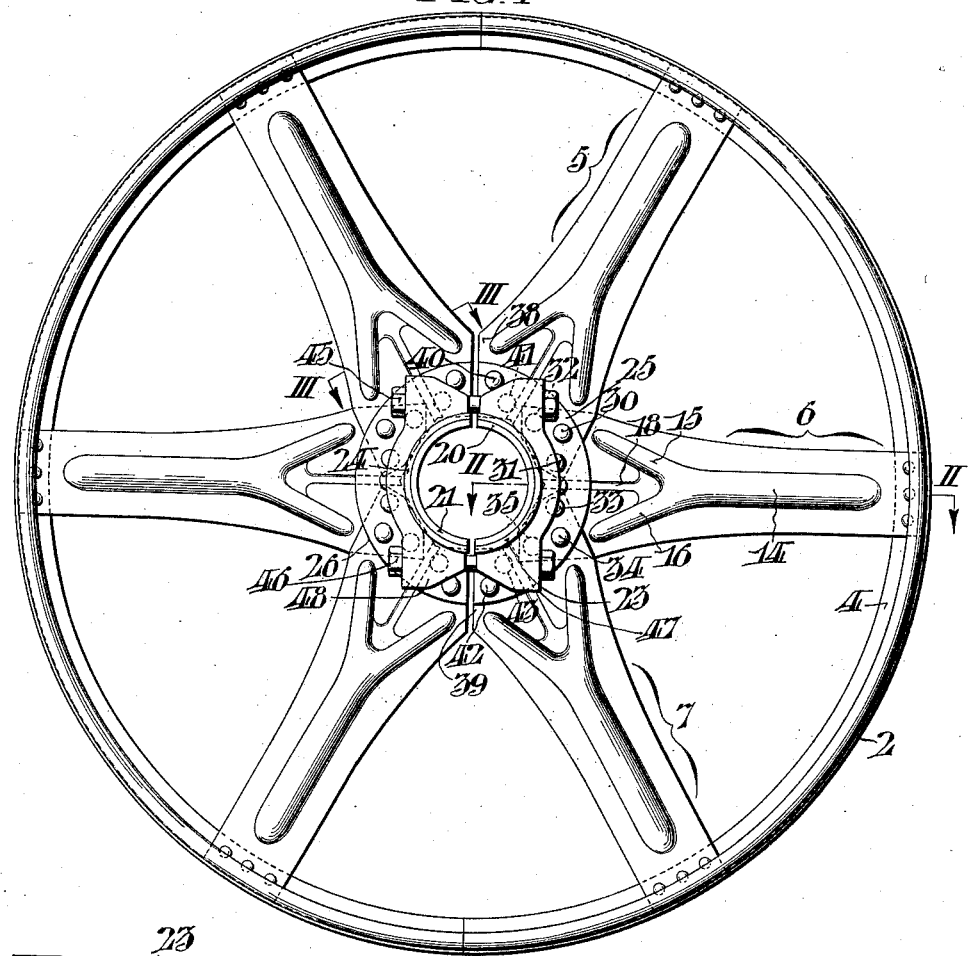
FIG. I.
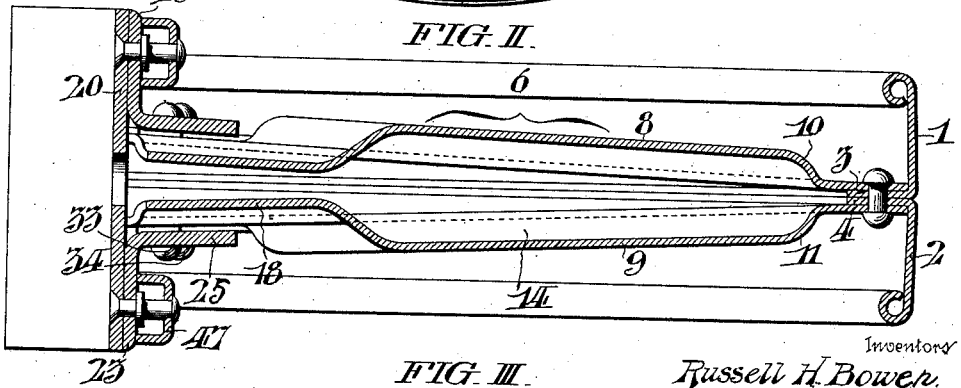
FIG. II.
FIG. III.
Witnesses
John C. Bergner
James H. Bell
Inventors
Russell H. Bowen
and
Allan Walker
By Macy & Paul
Attorneys
COLUMBIA PLANOGRAPH CO., WASHINGTON, D. C.

UNITED STATES PATENT OFFICE.

RUSSELL H. BOWEN, OF PALMYRA, NEW JERSEY, AND ALLAN WALKER, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA.

PULLEY.

1,016,666.  Specification of Letters Patent.  Patented Feb. 6, 1912.

Application filed March 24, 1911.  Serial No. 616,767.

*To all whom it may concern:*

Be it known that we, RUSSELL H. BOWEN, of Palmyra, in the county of Burlington and State of New Jersey, and ALLAN WALKER, of Philadelphia, in the county of Philadelphia and State of Pennsylvania, have invented certain new and useful Improvements in Pulleys, whereof the following is a specification, reference being had to the accompanying drawings.

In said drawings, Figure I, represents a view in side elevation of a pulley embodying our invention. Fig. II, is a transverse section through one-half thereof upon an enlarged scale on the line II, II, of Fig. I. Fig. III, is a transverse section through one of the spokes on the line III, III, of Fig. I, but upon a scale corresponding to that of Fig. II.

Our invention relates particularly to sheet metal pulleys, and, as shown, is embodied in a so-called split pulley composed of two similar diametrically divided halves adapted to be secured together upon a hub in the well known manner.

The pulley is preferably made of sheet metal, the several elements which constitute it being stamped or pressed into shape.

Since the two halves of the pulley are similar in construction, a description of one thereof will suffice.

Each segment of the pulley rim consists of two similar semi-circular bands 1, and 2, provided at their meeting edges with flanges 3, and 4, respectively, which are riveted together and to the outer ends of the spokes 5, 6, 7, etc. Each of the spokes comprises a pair of similar spoke-pieces such as 8, and 9, which have the general configuration shown, that is to say, said pieces diverge as indicated by the dotted lines at 10, and 11, respectively, from points near that of their attachment to the rim, toward their inner extremities. Each of the spoke pieces consists of a flat plate which widens at its inner extremity as shown in Fig. I, and which is provided with a longitudinal corrugation 14, preferably terminating in bifurcated corrugations 15, and 16, prolonged into the widened inner end portion of the spoke pieces. Said corrugations 14, 15, and 16, protrude outward from the external faces of the respective spoke-pieces. The spoke-pieces are however, also provided with internally protruding corrugations 18, which are preferably arranged in axial prolongation of the corrugations 14. Thus, while the metal at the inner extremity of the spoke-pieces, is corrugated, the corrugations protrude from the internal face of the metal, thus leaving the external surface flush.

The spoke-pieces are secured to the hub in the following manner: The hub comprises two similar semi-cylindrical hub shells 20, 21, upon the external surface of which are mounted semi-annular hub-ring portions 23, and 24, respectively, having semi-annular flanges 25, and 26, at their proximate edges, said flanges extending radially outward in parallelism with the respective planes of the inner ends of the spoke-pieces. The spoke-pieces are secured to the flanges of these hub-ring portions by means of rivets 30, 31, 32, 33, etc., the widened inner extremities being preferably arranged in the overlapping relation shown, that is to say, the widened inner extremities of the spokes 5, and 7, which are adjacent to the intermediate spoke 6, lie between the extremity of the spoke 6, and the face of the hub-ring flange 25, to which they are all attached. By reason of this overlapping relation, the rivets 30, 31, and 32, are common to the spokes 5, and 6, while the rivets 33, 34, and 35, are common to the spokes 6, and 7. The inner extremities of the spokes 5, and 7, at the sides remote from the intermediate spoke 6, are cut away as shown at 38, and 39, in conformity with the diametrical division of the hub shell so as to coincide substantially with the plane of the edges thereof. The outer edge of the spoke 5, is secured to the flange of the hub-ring, by means of the rivets 40, and 41, the corresponding part of the spoke 7, being attached to the hub-ring by rivets 42, and 43.

The two parts of the hub are secured together by means of the bolts 45, and 46, passing through the clamping pieces 47, and 48, which are of the ordinary construction, and hence need not be further described.

It will be noted that in the above described structure, the spoke pieces are strengthened by corrugations which extend longitudinally throughout substantially their entire length, and that by the alternating protrusion of the corrugations with respect to the faces of the spoke-pieces, that portion of the corrugations, which is immediately adjacent to the region of attachment to the hug ring flange, is upon the side remote from said flange, so that the inner extremity of the spoke-pieces can lie flat against the flange, or against the faces of the adjacent spoke-pieces, which it may overlap. This permits the use of a plain radial flange upon the hub ring, notwithstanding the presence of the corrugations upon the spoke-pieces at the region adjacent thereto. By thus prolonging the corrugations and widening the inner ends of the spoke-pieces, we are enabled to employ hub-rings whose flanges are of relatively small radial extent, without sacrificing any substantial amount of strength in the structure, as a whole, and this feature of strengthening is enhanced by the bifurcations of the corrugations in the spoke.

For convenience of description, we use the term "internally protruding", and "externally protruding", to respectively describe the relation of the corrugations upon the spoke pieces, the term "internally protruding", signifying that the corrugations are concave with relation to that face of the metal which is immediately adjacent to the metal of the hub-ring flange, and vice versa.

Having thus described our invention, we claim:

1. In a pulley, the combination with a rim; a hub-shell; and hub-rings provided with radially projecting flanges; of a plurality of spokes, each comprising a pair of spoke-pieces, said spoke-pieces being provided with internally protruding corrugations at the region adjacent to the opposed faces of the hub-ring flanges, and with an externally-protruding corrugation along the portion between the outer periphery of said flanges and the inner periphery of the rim; and means for securing the inner extremities of the spoke-pieces to the hub-ring flanges.

2. In a pulley, the combination with a rim; a hub-shell; and hub-ring portions provided with radially projecting flanges; of a plurality of spokes, each comprising a pair of spoke-pieces widened at their inner ends; said spoke-pieces being provided with internally protruding corrugations at the region adjacent to the opposed faces of the hub-ring flanges, and with externally protruding corrugations extending longitudinally with the spoke-pieces and bifurcated at the wide inner end portions thereof.

In testimony whereof, we have hereunto signed our names at Philadelphia, Pennsylvania, this eighteenth day of March 1911.

RUSSELL H. BOWEN.
ALLAN WALKER.

Witnesses:
CHARLES E. BRINLEY,
JAMES H. BELL.